(12) United States Patent
Koskinen et al.

(10) Patent No.: US 11,638,188 B2
(45) Date of Patent: Apr. 25, 2023

(54) BWP HANDLING IN IDLE MODE AND INACTIVE MODE

(71) Applicant: NOKIA TECHNOLOGIES OY, Espoo (FI)

(72) Inventors: Jussi-Pekka Koskinen, Oulu (FI); Jarkko Koskela, Oulu (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/764,372

(22) PCT Filed: Nov. 14, 2017

(86) PCT No.: PCT/FI2017/050782
§ 371 (c)(1),
(2) Date: May 14, 2020

(87) PCT Pub. No.: WO2019/097104
PCT Pub. Date: May 23, 2019

(65) Prior Publication Data
US 2020/0280894 A1 Sep. 3, 2020

(51) Int. Cl.
*H04W 36/08* (2009.01)
*H04L 1/1867* (2023.01)
(Continued)

(52) U.S. Cl.
CPC .......... *H04W 36/08* (2013.01); *H04L 1/1887* (2013.01); *H04L 5/0092* (2013.01); *H04W 24/08* (2013.01)

(58) Field of Classification Search
CPC . H04W 72/0453; H04W 36/08; H04W 24/08; H04L 1/1887; H04L 5/0092
See application file for complete search history.

(56) References Cited

U.S. PATENT DOCUMENTS 10,477,457 B2 * 11/2019 Park .................... H04L 5/1469
10,673,601 B2 *  6/2020 Chen .................... H04L 5/0098
(Continued)

FOREIGN PATENT DOCUMENTS

| RU | 2634922 C2 | 11/2017 |
|---|---|---|
| WO | 2017183926 A1 | 10/2017 |
| WO | WO 2017/183926 A1 | 10/2017 |

OTHER PUBLICATIONS

International Search Report and Written Opinion for International Application No. PCT/FI2017/050782, dated Feb. 28, 2018, 15 pages.
(Continued)

*Primary Examiner* — Shukri Taha
(74) *Attorney, Agent, or Firm* — Alston & Bird LLP

(57) ABSTRACT

It is provided a method, comprising monitoring if an information on a limitation of a network bandwidth part is received from a cell; basing a decision on the information on the limitation and a capability of a terminal to support a terminal bandwidth part if the information on the limitation is received, wherein the decision is about at least one of whether or not the terminal camps on the cell and whether or not the terminal reselects the cell; instructing the terminal on the at least one of the camping on the cell and the reselecting the cell based on the decision.

22 Claims, 3 Drawing Sheets

Load adaptation on WB carrier            Power saving for WB capable UE

(51) Int. Cl.
  *H04L 5/00* (2006.01)
  *H04W 24/08* (2009.01)

(56) References Cited

U.S. PATENT DOCUMENTS

| | | | |
|---|---|---|---|
| 2013/0083753 | A1 | 4/2013 | Lee et al. |
| 2016/0007334 | A1 | 1/2016 | Kim et al. |
| 2016/0057708 | A1* | 2/2016 | Siomina ............ H04W 72/1263 455/452.2 |
| 2017/0048760 | A1 | 2/2017 | Vajapeyam et al. |
| 2017/0111756 | A1 | 4/2017 | Guo et al. |
| 2020/0374866 | A1* | 11/2020 | Takeda .................. H04W 72/12 |

OTHER PUBLICATIONS

3GPP TSG-RAN WG2 #99bis, R2-1711387; "Impacts of BWP for UE in IDLE and INACTIVE", Prague, Czech Republic; Oct. 9-13, 2017, 4 pages.
3GPP TSG-RAN WG2 Meeting #99bis, R2-1711640; "Initial Discussion on the Impacts of BWP on RAN2", Prague, Czech Republic; Oct. 9-13, 2017, 5 Pages.
3GPP TSG-RAN WG2 NR #99bis Meeting, R2-1711188; "Signaling to Support Bandwidth Part", Prague, Czech; Oct. 9-13, 2017, 7 pages.
Office Action and Search Report for Russian Patent Application No. 2020119303/07(032717) dated Oct. 2, 2020, with English translation, 12 pages.
*Impacts of BWP for UE in IDLE and Inactive*, R2-1711387, 3GPP TSG-RAN WG2 #99bis, LG Electronics, Inc. (Oct. 2017), 4 pages.
*Initial Discussion on the Impacts of BWP on RAN2*, R2-1711640, 3GPP TSG-RAN WG2 Meeting #99bis, ZTE Corporation, Sane Chips (Oct. 2017), 5 pages.
International Search Report and Written Opinion for Application No. PCT/FI2017/050782 dated Feb. 28, 2018.
Kim et al., *3GPP SA2 Architecture and Functions for 5G Mobile Communication System*, ICT Express 3 (Apr. 2017) pp. 1-8.
*Signaling to Support Bandwidth Part*, R2-1711188, 3GPP TSG-RAN WG2 NR #99bis, Samsung (Oct. 2017), 7 pages.
Office Action for Korean Application No. 10-2020-7017047 dated Oct. 14, 2021, 13 pages.
NTT Docomo, Inc., "RAN WG's Progress on NR WI in the May Meeting 2017", 3GPP TSG-RAN WG2 NR Ad-Hoc, R2-1706443, (Jun. 27-29, 2017), 45 pages.
Ericsson, "On Bandwidth Parts and Multiple SSBs", 3GPP TSG-RAN WG2 #99bis, Tdoc R2-1711822, (Oct. 9-13, 2017), 6 pages.
First Examination Report for Indian Application No. 202047024305 dated Apr. 7, 2021, 6 pages.
Office Action for Canadian Application No. 3,088,486 dated Aug. 18, 2021, 4 pages.
Office Action for Japanese Application No. 2020-526536 dated Aug. 4, 2021, 3 pages.
Decision to Grant for Russian Application No. 2020119303/07 dated Jun. 16, 2021, 15 pages.
Extended European Search Report for European Application No. 17932424.9 dated Nov. 10, 2021, 11 pages.
Office Action for ARIPO Application No. AP/P/2020/012467 dated Nov. 17, 2021, 5 pages.
Samsung, "The Impact of Bandwidth Part on RAN2: Overview and Issues", 3GPP TSG RAN WG2 #99bis, R2-1711595, (Oct. 9-13, 2017), 8 pages.
Office Action for Australian Application No. 2017439577 dated Jun. 29, 2022, 4 pages.
Decision to Grant for ARIPO Application No. AP/P/2020/012467 dated Sep. 21, 2022, 5 pages.
Decision to Grant for Japanese Application No. 2020-526536 dated Aug. 22, 2022, 5 pages.
Ericsson et al., "New WID on Even Further Enhanced MTC for LTE", 3GPP TSG RAN Meeting #75, RP-170465, (Mar. 6-9, 2017), 5 pages.
Office Action for Japanese Application No. 2020-526536 dated May 11, 2022, 4 pages.
Office Action for Korean Application No. 10-2020-7017047 dated Aug. 31, 2022, 18 pages.
Oppo et al., "WF on Bandwidth Part Configuration", 3GPP TSG RAN WG1 Meeting #89, R1-1709519, (May 15-19, 2017), 3 pages.

* cited by examiner

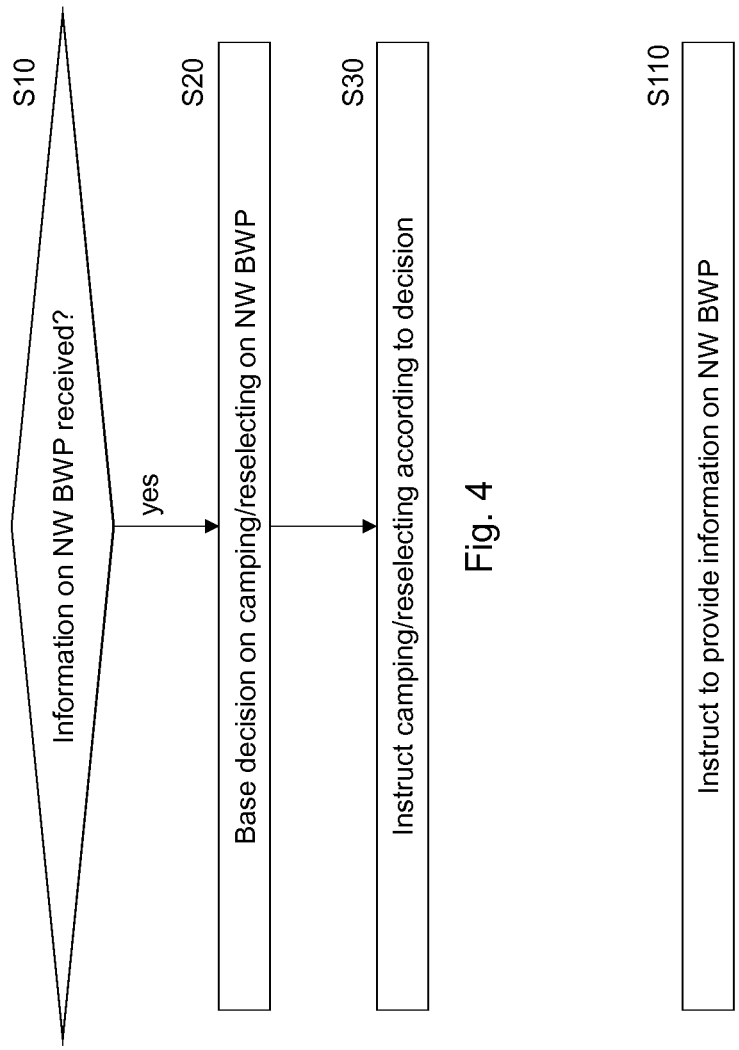
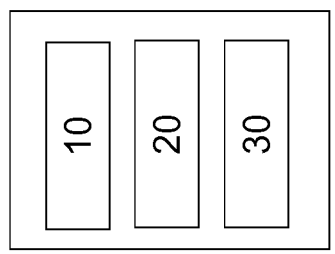
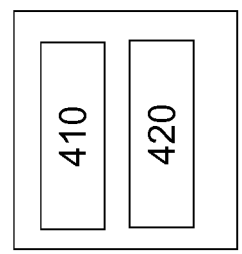

BWP HANDLING IN IDLE MODE AND INACTIVE MODE

CROSS-REFERENCE TO RELATED APPLICATIONS

This application is a national stage entry of International Application No. PCT/FI2017/050782, filed Nov. 14, 2017, entitled "BWP HANDLING IN IDLE MODE AND INACTIVE MODE" which is hereby incorporated by reference in its entirety.

FIELD OF THE INVENTION

The present invention relates to an apparatus, a method, and a computer program product related to handling of bandwidth parts, in particular to handling of bandwidth parts in NR.

Abbreviations

3GPP 3$^{rd}$ Generation Partnership Project
5G 5$^{th}$ Generation
5GC 5G Core Network
BWP Bandwidth Part
CN Core Network
CP Control Plane
DL Downlink
EDT Early Data Transmission
EPC Evolved Packet Core
FDM Frequency Division Multiplex
gNB 5G Node-B
IOT Internet Of Things
LTE Long Term Evolution
LTE-A LTE Advanced
MF MulteFire
MSG Message
NAS Non-Access Stratum
NR New Radio
NW Network
PCell Primary Cell
PRB Physical Resource Block
PSCell Primary SCell
RACH Random Access Channel
Rel Release
RRC Radio Resource Control
RRM Radio Resource Management
SCell Secondary Cell
SS Synchronization Signal
SSB SS Block
SUL Secondary Uplink
TDM Time Division Multiplex
UE User Equipment
UL Uplink
UP User Plane
WB Wideband
WiFi Wireless Fidelity

BACKGROUND OF THE INVENTION

Bandwidth part is defined as the number of PRBs (which indicate a certain bandwidth at certain frequency) where the UE can be scheduled in UL/DL. For DL, the used BWP also affects the bandwidth where the UE is expected to perform measurements. Each bandwidth part may also have a different numerology (i.e. subcarrier spacing). Some basic use cases for BWP are described in FIG. 1 and FIG. 2. Network (NW) bandwidth (BW) designates the total bandwidth provided by the network (e.g. by a cell, wherein the cell is considered to be a representative of the network).

As shown in FIG. 1, the network may schedule different BWPs (BWP1, BWP2) for a UE at different time slots, e.g. to adapt the load on the wideband (WB) carrier which comprises the NW BW. The different BWPs may share the same bandwidth (number of PRBs) but at different center frequencies (left part of FIG. 1), or they may have different bandwidths (right part of FIG. 1).

As shown in FIG. 2, the BWPs may have different numerologies in different time slots. In TDM operation, the BWPs of different numerologies occupy the same bandwidth (left part of FIG. 2), while in FDM operation, the BWPs of different numerologies may not overlap (right part of FIG. 2). Different cells of the network may provide different BWPs (also named NW BWPs).

Hence, a Bandwidth part (BWP) consists of part of the whole gNB bandwidth (also named NW BW). Each UE may be assigned a potentially different part of the UL/DL cell bandwidth in connected mode, and this is called the BWP. In NR Rel-15, it has been agreed that for each serving cell there is one single active BWP (UL and/or DL, for PCell/PSCell both UL & DL), but there can be more than one BWP configured at the UE so that the currently active BWP can be switched with one of the other configured BWPs (i.e. a configured (but non-active) BWP becomes active BWP and the formerly active BWP becomes a configured (but non-active) BWP).

The following has been agreed in RAN2:
Agreements for BWP operation in CONNECTED mode:
1 BWP impacts on the CONNECTED mode will be progressed by December 17. Impacts to IDLE mode/INACTIVE mode UEs will be discussed with SA after December 17.
2a RRC signalling supports to configure 1 or more BWPs (both for DL BWP and UL BWP) for a serving cell (PCell, PSCell).
2b RRC signalling supports to configure 0, 1 or more BWPs (both for DL BWP and UL BWP) for a serving cell SCell (at least 1 DL BWP) (impact of SUL still to be discussed)
3 For a UE, the PCell, PSCell and each SCell has a single associated SSB in frequency (RAN1 terminology is the is the 'cell defining SSB')
4 Cell defining SS block can be changed by synchronous reconfiguration for PCell/PSCell and SCell release/add for the SCell.
5 Each SS block frequency which needs to be measured by the UE should be configured as individual measurement object (i.e. one measurement object corresponds to a single SS block frequency).
6 The cell defining SS block is considered as the time reference of the serving cell, and for RRM serving cell measurements based on SSB (irrespective of which BWP is activated).

The following contributions include some discussion for IDLE mode handling:
R2-1711387: "Impacts of BWP for UE in IDLE and INACTIVE", LG Electronics Inc., discussion, Rel-15, NR_newRAT-Core;
R2-1710216: "Definition of cells for idle and connected UEs", Huawei, HiSilicon, discussion, Rel-15, NR_newRAT-Core.

5G introduces a new mode besides IDLE and CONNECTED known from LTE and LTE-A: "RRC-INACTIVE CONNECTED", also named "INACTIVE". When a UE moves to the INACTIVE mode, both UE and RAN keep the context information of the UE's RRC connection such as UE capabilities and security context, which have been obtained during RRC connection setup. In contrast, in IDLE mode, the context information is not maintained and UE always has to establish a new context information with network when moving from IDLE to CONNECTED. Thus, a transition from INACTIVE to CONNECTED for data transmission is lightweight (i.e. faster and requires less signalling) compared to a transition from IDLE to CONNECTED.

In the RRC-INACTIVE Connected mode, the UE is CN-CONNECTED, i.e., the CN considers that the UE is in the connected mode. Hence, when DL traffic for the UE arrives, CN simply forwards the traffic to RAN. Then, RAN triggers paging (called "RAN paging") for the UE to determine the location of the UE at cell level and once the UE responds to the paging, forwards the data to the UE.

In both IDLE mode and INACTIVE mode, the UE camps on a cell to listen for a paging signal and do other relevant procedures like cell reselection and system information reception. If the UE moves, it may reselect another cell to camp thereon, depending in particular on the signal strength of the involved cells (i.e. UE obeys the specified cell reselection rules according to the reselection information broadcast from the current serving cell). In both IDLE mode and INACTIVE mode, cell reselection is controlled by the UE and affected only indirectly by the reselection information from the cell broadcast.

More details are available at J. Kim et al., "3GPP SA2 architecture and functions for 5G mobile communication system", ICT Express 3 (2017), 1-8.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform monitoring if an information on a limitation of a network bandwidth part is received from a cell; basing a decision on the information on the limitation and a capability of a terminal to support a terminal bandwidth part if the information on the limitation is received, wherein the decision is about at least one of whether or not the terminal camps on the cell and whether or not the terminal reselects the cell; instructing the terminal on the at least one of the camping on the cell and the reselecting the cell based on the decision.

The monitoring may comprise at least one of monitoring if the information on the limitation is received on a broadcast channel; and monitoring if the information on the limitation is received in a dedicated signaling to the terminal.

The decision may be about whether or not the terminal camps on the cell, and the at least one processor, with the at least one memory and the computer program code, may be arranged to cause the apparatus to further perform inhibiting the terminal to camp on the cell if the limitation does not match the capability of the terminal.

The at least one processor, with the at least one memory and the computer program code, may be arranged to cause the apparatus to further perform supervising if a priority for the terminal bandwidth part is received; wherein the decision may be additionally based on the priority if the priority for the terminal bandwidth part is received.

The at least one processor, with the at least one memory and the computer program code, may be arranged to cause the apparatus to further perform, if the decision is to camp on the cell or to reselect the cell: selecting one of plural access parameters based on the information on the limitation and the capability of the terminal; instructing the terminal to reselect the cell and to camp on the cell, respectively, using the selected one of the access parameters.

The at least one processor, with the at least one memory and the computer program code, may be arranged to cause the apparatus to further perform, if the decision is to camp on the cell or to reselect the cell: choosing one or more of plural types of access based on the information on the limitation and the capability of the terminal; instructing the terminal to access the cell according to the selected one or more types of access; inhibiting the terminal to access the cell according to a type of access different from the selected one or more types of access.

The at least one processor, with the at least one memory and the computer program code, may be arranged to cause the apparatus to further perform checking if the terminal belongs to a type of terminal; inhibiting to base the decision on the information on the limitation if the terminal does not belong to the type of terminal.

The limitation may be related to at least one of
a network bandwidth part usable for early data transmission;
a bandwidth part usable by the terminal for data transmission in an INACTIVE mode;
a bandwidth part usable by the terminal for data transmission in a CONNECTED mode;
a bandwidth part usable for active data transfer;
a bandwidth part usable for sending data encapsulated in control plane messages;
a bandwidth part usable for the Ultra-Reliable Low Latency Communication transmission)
a bandwidth part reserved only for terminals of a certain CSG;
a bandwidth part usable for carrier aggregation purposes;
a bandwidth part usable for dual connectivity purposes; and
a set of supported bandwidth parts in the cell.

According to a second aspect of the invention, there is provided an apparatus, comprising at least one processor, at least one memory including computer program code, and the at least one processor, with the at least one memory and the computer program code, being arranged to cause the apparatus to at least perform instructing a base station to provide an information on a limitation of a network bandwidth part provided by the base station.

The providing may comprise at least one of broadcasting the information on the limitation and providing the information on the limitation in a dedicated signaling to a terminal.

The at least one processor, with the at least one memory and the computer program code, may be arranged to cause the apparatus to further perform instructing the base station to indicate a respective priority for each of one or more terminal bandwidth parts.

According to a third aspect of the invention, there is provided a method, comprising monitoring if an information on a limitation of a network bandwidth part is received from a cell; basing a decision on the information on the limitation and a capability of a terminal to support a terminal bandwidth part if the information on the limitation is received, wherein the decision is about at least one of whether or not the terminal camps on the cell and whether or not the terminal reselects the cell; instructing the terminal on the at least one of the camping on the cell and the reselecting the cell based on the decision.

The monitoring may comprise at least one of monitoring if the information on the limitation is received on a broadcast channel; and monitoring if the information on the limitation is received in a dedicated signaling to the terminal.

The decision may be about whether or not the terminal camps on the cell, and the method may further comprise inhibiting the terminal to camp on the cell if the limitation does not match the capability of the terminal.

The method may further comprise supervising if a priority for the terminal bandwidth part is received; wherein the decision may be additionally based on the priority if the priority for the terminal bandwidth part is received.

The method may further comprise, if the decision is to camp on the cell or to reselect the cell: selecting one of plural access parameters based on the information on the limitation and the capability of the terminal; instructing the terminal to reselect the cell and to camp on the cell, respectively, using the selected one of the access parameters.

The method may further comprise, if the decision is to camp on the cell or to reselect the cell: choosing one or more of plural types of access based on the information on the limitation and the capability of the terminal; instructing the terminal to access the cell according to the selected one or more types of access; inhibiting the terminal to access the cell according to a type of access different from the selected one or more types of access.

The method may further comprise checking if the terminal belongs to a type of terminal; inhibiting to base the decision on the information on the limitation if the terminal does not belong to the type of terminal.

The limitation may be related to at least one of
a network bandwidth part usable for early data transmission;
a bandwidth part usable by the terminal for data transmission in an INACTIVE mode;
a bandwidth part usable by the terminal for data transmission in a CONNECTED mode;
a bandwidth part usable for active data transfer;
a bandwidth part usable for sending data encapsulated in control plane messages;
a bandwidth part usable for the Ultra-Reliable Low Latency Communication transmission)
a bandwidth part reserved only for terminals of a certain CSG;
a bandwidth part usable for carrier aggregation purposes;
a bandwidth part usable for dual connectivity purposes; and
a set of supported bandwidth parts in the cell.

According to a fourth aspect of the invention, there is provided a method, comprising instructing a base station to provide an information on a limitation of a network bandwidth part provided by the base station.

The providing may comprise at least one of broadcasting the information on the limitation and providing the information on the limitation in a dedicated signaling to a terminal.

The method may further comprise instructing the base station to indicate a respective priority for each of one or more terminal bandwidth parts.

Each of the methods of the third and fourth aspects may be a method of bandwidth part handling.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:
BWP works in both IDLE mode and INACTIVE mode;
UL/DL messages are not lost due to BWP mismatch between NW and UE;
BWP may be used to control UE behavior to some extent even in IDLE mode or INACTIVE mode.
The UE would not start unnecessary connection establishment in case that the NW is not supporting the BWP the UE is supporting.
Avoids unnecessary signaling
Saves UE battery It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 3 shows an apparatus according to an embodiment of the invention;
FIG. 4 shows a method according to an embodiment of the invention;
FIG. 5 shows an apparatus according to an embodiment of the invention;
FIG. 6 shows a method according to an embodiment of the invention;
and
FIG. 7 shows an apparatus according to an embodiment of the invention;

DETAILED DESCRIPTION OF CERTAIN EMBODIMENTS

Figure 1:
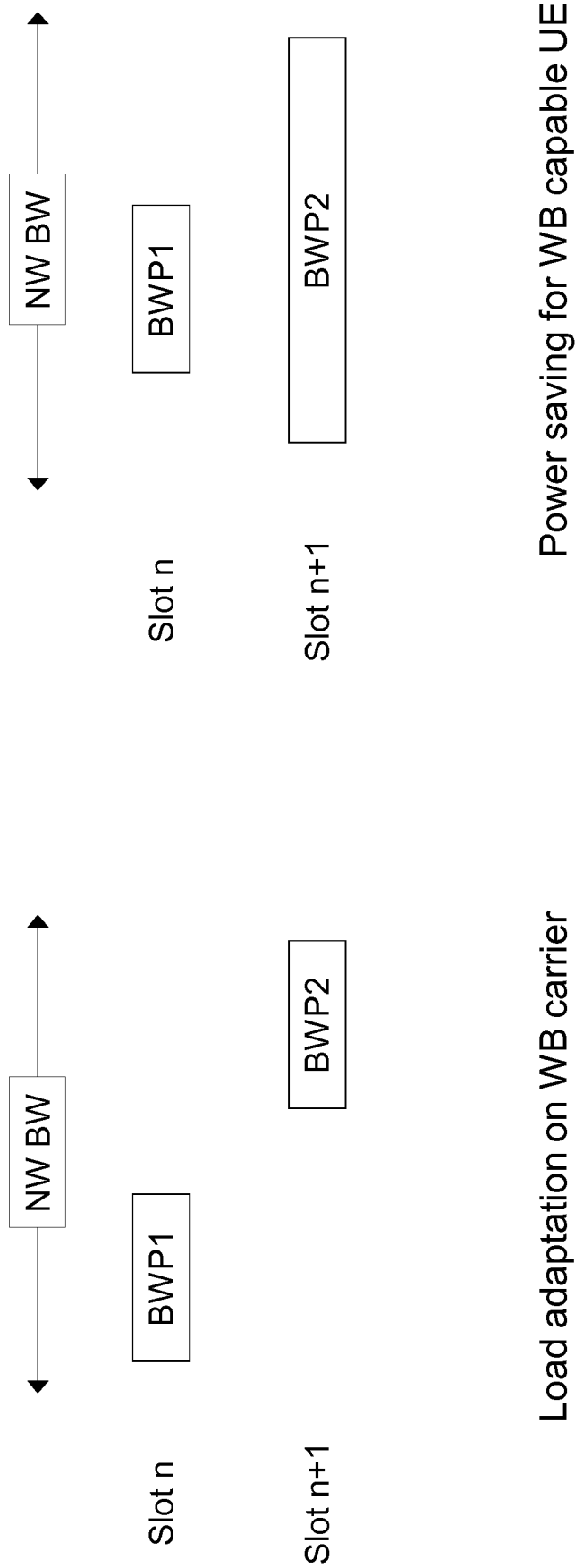
FIG. 1 shows two basic use cases for BWP.
Figure 2:
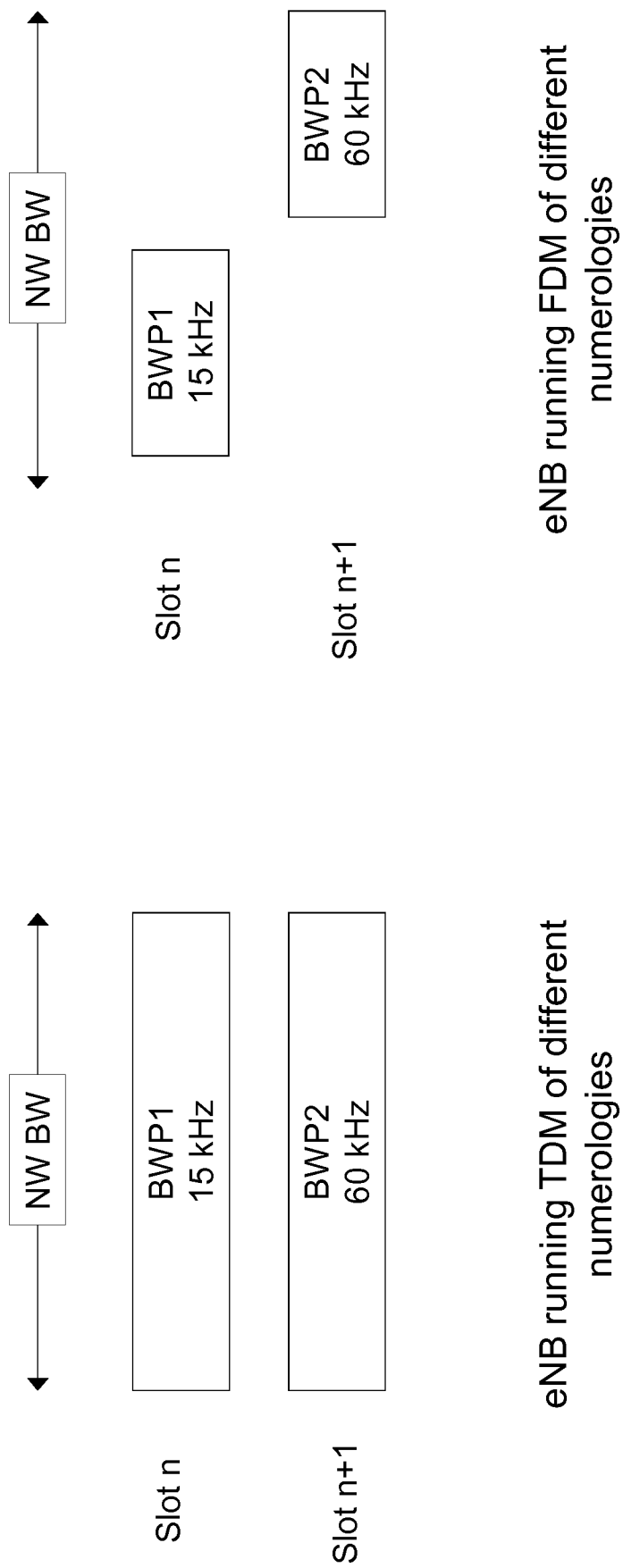
FIG. 2 shows another two basic use cases for BWP.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

This invention focuses primarily on the BWP handling in IDLE and INACTIVE mode.

While it is expected that there will be some minimum BW that both UEs and NWs support, in practice NW may support different minimum bandwidth compared to what the UE supports. For example, the UE may support only 5 MHz and the NW may support only 20 MHz, e.g. due to scheduler not implementing lower BW option. Additionally, different BWP sizes can be used for different purposes: e.g. very low BW-capable UEs may be served in one part of gNB BW (NW BW) and "regular" UEs in a different part (or even in the whole NW BW) of the gNB BW. Hence, it is not clear how UEs can be directed to different BWP in IDLE or INACTIVE, or even prevented from camping in a cell with minimum BW different from the one supported by the UE.

UE may use different bandwidths for data transmissions, and there may be different mechanisms for transmitting data towards the network. Typically, UE uses user plane for transmitting data, i.e. communication established between UE and network that utilizes configured resources that are scheduled implicitly or explicitly between UE and network. However, in certain cases control plane, which is typically used for setting up the data transmission between UE and network, may also be used for transmitting data. In particular, the data transmission may utilize e.g. the signalling protocol normally used for exchanging NAS information between UE and network, or the signalling message used for establishing the RRC connection between UE and network. These options are sometimes called "Control Plane" or "Early Data Transmission" optimizations for data transfer, and are typically envisioned to be used for cases when only a small amount of data needs to be transferred between UE and network.

According to some embodiments of the invention, the network broadcasts its BWP limitations to all the UEs to aid in the IDLE or INACTIVE mode operation. This information may affect UE IDLE or INACTIVE mode cell selection/reselection criteria, so UEs not supporting the BW of the cell do not camp in a cell where they cannot obtain service because of a mismatch of the BWP. Further, the UE cell access may depend on the amount of BW supported by the NW and the UE.

Some aspects of the invention comprise the following:
NW broadcasts (advertises) information on its BWP limitations (e.g. minimum and/or maximum NW BWP size) for DL and/or UL operation
UE receives the information on BWP limitations. UE may take this information into account for e.g.:
Cell camping criteria: A cell is not suitable if UE supported BWP (UE BWP limitation) does not meet advertised NW BWP limitations (e.g. minimum/maximum BW). I.e., preferably, the capability of the UE with respect to BWP limitation is the same as the limitation on NW BWP. In some embodiments, a cell may be selected if, in DL, the NW BWP is smaller than the UE BWP and, in UL, the NW BWP is larger than the UE BWP. Thus, it is ensured that a transmission is not lost because of BWPs of different sizes.
Cell reselection criteria: the UE may prioritize cells/carriers supporting certain types of BWPs. Such prioritization may be predefined or the priorities may be provided by the network.
As an example of predefined priorities, the UE may prefer cells supporting exactly the bandwidth part size the UE supports, too. I.e., cells with a bandwidth part size exceeding that of the UE (in uplink) or less than that of the UE (in downlink) are not preferred although feasible. In such embodiments, UE implicitly builds the priorities based on the advertised NW BWP limitations. In these embodiments, NW need not to transmit explicitly the priorities.
NW may indicate different priorities for UE with different capabilities for BWP to affect the UE's cell reselection priorities; the priority for a certain BWP supported by the UE (also named terminal bandwidth part) may be different or the same for different cells of the network.
The priorities may additionally depend on the category of the UE: e.g. different CN (EPC/MF) registered UEs may use different reselection parameters to allow different UEs reselect different cells (for e.g. steering certain UEs more towards certain frequency bands that can treat such UEs more efficiently)
The NW may indicate the priorities in system information or via dedicated signaling given to UE at the end of RRC connection release to be used by the UE in IDLE or INACTIVE state. The NW may indicate the priorities along with the information on BWP limitations or in a separate broadcast message or dedicated signaling to the UE.
The Cell access parameters may also be grouped according to the allowed access bandwidth
For example, UEs supporting limited BW may utilize different access resources than those supporting wider BW
UEs supporting different network slices may also be indicated to require certain BW in the cell, so that UE's attempting a connection according to a certain network slice would do access according to different set of access parameters.
NW informs the UE on the grouping via broadcast or dedicated signalling.
Depending on the advertised NW BWP limitation, the UE may be allowed to camp on the cell but only certain type of access is allowed
Early data transmission (EDT), e.g. data transmission within the RACH MSG3 and MSG4 can be allowed
Data encapsulated in the CP messages can be allowed
Signaling can be allowed e.g. by NAS signaling or RRC signaling.
Predefined types of access could e.g. low/high priority data etc.

In some embodiments of the invention, only certain type of UEs may take the information on NW BWP limitation into account. For example, only "normal" UEs may take the NW BWP limitation into account but IOT devices (which may e.g. support smaller BW than "normal" UEs) do not. As another example, only UEs supporting certain network slices may utilize the slice-specific resources, including any slice-specific BWPs.

In addition or alternatively to minimum/maximum BWP, the NW may signal e.g. one of the following:
EDT BWP (i.e. BWP used for EDT purposes)
RRC INACTIVE BWP (i.e. BWP used by UEs in INACTIVE)
RRC CONNECTED BWP (i.e. BWP used by UEs in CONNECTED)
Data transfer BWP (i.e. BWP used for active data transfer)
Data over Control Plane BWP (i.e. BWP used for sending data encapsulated in control plane messages)
Ultra-Reliable Low Latency Communication (URLLC) BWP (i.e. BWP used for the purpose of URLLC transmission)
Closed Subscriber Group (CSG) BWP (i.e. BWP reserved only for UEs utilizing a certain CSG)
Carrier aggregation BWP (i.e. BWP used for CA purposes)
Dual connectivity BWP (i.e. BWP used for DC purposes)
Set of supported BWPs in cell (e.g. all the BWPs used in the cell).

The UE may take into account this information on BWP when deciding on camping and/or cell reselection for the respective specific cases, too.

In some embodiments of the invention, the information on NW BWP limitation may be advertised using dedicated signalling for IDLE or INACTIVE mode usage while the UE is in the CONNECTED mode for use in IDLE/INACTIVE mode (e.g. during the transition from CONNECTED mode to IDLE/INACTIVE mode).

Table 1 provides a signalling example for BWP handling in IDLE/INACTIVE mode. Note that in step 7, the UE is in IDLE mode and hence, the NW BWP limitation for data transfer is relevant because it does not make sense to camp on the cell where service cannot be provided to the UE.

On the other hand, in step 14, the UE is in INACTIVE mode (see step 12), and hence, the NW BWP limitation for INACTIVE mode is relevant. In the INACTIVE mode, INACTIVE BWP may be used for the data transmission in INACTIVE state, i.e. data transfer in the random access messages 3 and 4. Message 3 may be used for data transmission in uplink and message 4 may be used for data transmission in downlink. Data transfer BWP is used in connected mode.

On the other hand, since the BWP limitations of the UE and cell 5 for data transmission in downlink in the CONNECTED mode do not match, the UE cannot be moved into the CONNECTED mode in cell 5.

TABLE 1

Signalling example according to an embodiment of the invention

| Step | Procedure | Message Sequence UE - NW | Message |
|---|---|---|---|
| 0 | The UE supports the following BWP:<br>10 MHZ BWP for both UL and DL in CONNECTED mode.<br>5 MHZ BWP in INACTIVE mode for both UL and DL<br>The UE is in IDLE mode | — | |
| 1 | gNB (cell 1) broadcast in the system information the following information:<br>Minimum DL BWP for data transfer in CONNECTED mode 20 MHz<br>Minimum UL BWP for data transfer in CONNECTED mode 20 MHz | <-- | System information |
| 2 | The UE reads the system information from cell 1 and does not camp there, because the BWP supported by the UE is not advertised by the gNB | | |
| 3 | gNB (cell 2) broadcast in the system information the following information:<br>Minimum DL BWP for data transfer in CONNECTED mode 10 MHz<br>Minimum UL BWP for data transfer in CONNECTED mode 10 MHz<br>Minimum DL BWP for data transfer in INACTIVE mode 5 MHZ<br>Minimum UL BWP for data transfer in INACTIVE mode 5 MHZ | <-- | System information |
| 4 | The UE reads the system information from cell 2 and starts to camp there, because the BWPs for CONNECTED supported by the UE are advertised by the gNB | | |
| 5 | The UE moves geographically | | |
| 6 | gNB (cell 3) broadcast in the system information the following information:<br>Minimum DL BWP for data transfer in CONNECTED mode 20 MHz<br>Minimum UL BWP for data transfer in CONNECTED mode 20 MHz<br>Minimum DL BWP for data transfer in INACTIVE mode 5 MHZ<br>Minimum UL BWP for data transfer in INACTIVE mode 5 MHZ | <-- | System information |
| 7 | The UE reads the system information from cell 3 and does not camp there, because the UE is in IDLE (not INACTIVE) and BWP for data transfer supported by the UE is not advertised by the gNB. | | |
| 8 | The UE moves geographically | | |
| 9 | gNB (cell 4) broadcast in the system information the following information:<br>Minimum DL BWP for data transfer in CONNECTED mode 10 MHz<br>Minimum UL BWP for data transfer in CONNECTED mode 10 MHz<br>Minimum DL BWP for data transfer in INACTIVE mode 5 MHZ<br>Minimum UL BWP for data transfer in INACTIVE mode 5 MHZ | <-- | System information |

TABLE 1-continued

Signalling example according to an embodiment of the invention

| Step | Procedure | Message Sequence UE - NW | Message |
|---|---|---|---|
| 10 | The UE reads the system information from cell 4 and starts to camp there, because the BWPs for CONNECTED supported by the UE are advertised by the gNB | | |
| 11 | Data transfers starts and the UE goes to CONNECTED | <--> | Connection establishment |
| 12 | The RRC Connection is released and the UE is moved to INACTIVE | <-- | RRC Connection Release |
| 13 | The UE moves geographically | | |
| 14 | gNB (cell 5) broadcast in the system information the following information:<br>    Minimum DL BWP for data transfer in CONNECTED mode 20 MHz<br>    Minimum UL BWP for data transfer in CONNECTED mode 20 MHz<br>    Minimum DL BWP for data transfer in INACTIVE mode 5 MHZ<br>    Minimum UL BWP for data transfer in INACTIVE mode 5 MHZ | <-- | System information |
| 15 | The UE reads the system information from cell 3 and starts to camp there, because the UE is INACTIVE and INACTIVE BWP supported by the UE is advertised by the gNB. | | |

FIG. 3 shows an apparatus according to an embodiment of the invention. The apparatus may be a terminal such as a UE, an IoT device, a MTC device, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises monitoring means 10, deciding means 20, and instructing means 30. Each of the monitoring means 10, deciding means 20, and instructing means 30 may be a monitor, decider, and instructor, respectively. Each of the monitoring means 10, deciding means 20, and instructing means 30 may be a monitoring processor, deciding processor, and instructing processor, respectively.

The monitoring means 10 monitors if an information on a limitation of a network bandwidth part is received from a cell (S10).

If the information on the limitation is received (S10="yes"), the deciding means 20 bases a decision on the information on the limitation and a capability of a terminal to support a terminal bandwidth part (S20). The decision is about at least one of whether or not the terminal camps on the cell and whether or not the terminal reselects the cell.

The instructing means 30 instructs the terminal on the at least one of the camping on the cell and the reselecting the cell based on the decision (S30).

FIG. 5 shows an apparatus according to an embodiment of the invention. The apparatus may be a base station such as a gNB, an eNB, or a NB, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises instructing means 110. The instructing means 110 may be an instructor. The instructing means 110 may be an instructing processor.

The instructing means 110 instructs a base station to provide an information on a limitation of a network bandwidth part provided by the base station (S110).

FIG. 7 shows an apparatus according to an embodiment of the invention. The apparatus comprises at least one processor 410, at least one memory 420 including computer program code, and the at least one processor 410, with the at least one memory 420 and the computer program code, being arranged to cause the apparatus to at least perform at least one of the methods according to FIGS. 4 and 6.

Embodiments of the invention are described with respect to a UE. A UE is a particular kind of a terminal. Other terminals may belong to embodiments of the invention. E.g., terminals in which embodiments of the invention are implemented may be a IoT device, a MTC device, a laptop, a tablet, a smartphone, a mobile phone, etc.

Some embodiments of the invention may be employed in 3GPP devices. However, embodiments of the invention are not limited to 3GPP devices. E.g. embodiments of the invention may be employed in other wireless or wireline communication systems such as WiFi if they provide a function corresponding to bandwidth parts.

Some embodiments of the invention are embodied as a UE application. However, they may be differently embodied, e.g. hard coded on a chip which may be integrated into a UE.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal such as a UE, an IoT device, a MTC device etc., or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a base station such as a NodeB, an eNodeB, or a gNodeB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:
1. An apparatus comprising:
at least one processor; and
at least one memory including computer program code, the at least one processor, with the at least one memory and the computer program code, being configured to cause the apparatus to at least:
receive, from a base station, information on a limitation of one or more bandwidth parts supported in a cell of the base station, wherein the one or more bandwidth parts are one or more early data transmission bandwidth parts;
select an access parameter based on the information on the limitation of the one or more bandwidth parts supported in the cell and a limitation of one or more other bandwidth parts supported by the apparatus;
instruct the apparatus to reselect the cell or to camp on the cell using the selected access parameter; and
inhibit access to the cell based on the limitation of the one or more bandwidth parts supported in the cell and the limitation of the one or more other bandwidth parts supported by the apparatus.

2. The apparatus according to claim 1, wherein the at least one processor, with the at least one memory and the computer program code, are further configured to cause the apparatus to:
monitor whether the information on the limitation of the one or more bandwidth parts supported in the cell is received on a broadcast channel or in dedicated signaling to the apparatus.

3. The apparatus according to claim 1, wherein the at least one processor, with the at least one memory and the computer program code, are further configured to cause the apparatus to:
inhibit the apparatus from camping on the cell if the limitation of the one or more bandwidth parts supported in the cell does not match the limitation of the one or more other bandwidth parts supported by the apparatus.

4. The apparatus according to claim 1, wherein the at least one processor, with the at least one memory and the computer program code, are further configured to cause the apparatus to:
inhibit access to the cell based on a priority for the one or more other bandwidth parts supported by the apparatus.

5. The apparatus according to claim 1, wherein the at least one processor, with the at least one memory and the computer program code, are further configured to cause the apparatus to:
select one or more types of access based on the information on the limitation of the one or more bandwidth parts supported in the cell and the limitation of the one or more other bandwidth parts supported by the apparatus;
instruct the apparatus to access the cell according to the selected one or more types of access; and
inhibit the apparatus to access the cell according to types of access different than the selected one or more types of access.

6. The apparatus according to claim 1, wherein the at least one processor, with the at least one memory and the computer program code, are further configured to cause the apparatus to:
inhibit access to the cell based on a type of the apparatus.

7. The apparatus according to claim 1, wherein the limitation of the one or more bandwidth parts supported in the cell is related to at least one of:
a bandwidth part usable by a terminal for data transmission in an INACTIVE mode;
a bandwidth part usable by the terminal for data transmission in a CONNECTED mode;
a bandwidth part usable for active data transfer;
a bandwidth part usable for sending data encapsulated in control plane messages;
a bandwidth part usable for Ultra-Reliable Low Latency Communication transmission (URLLC);
a bandwidth part reserved only for terminals of a certain Closed Subscriber Group (CSG);
a bandwidth part usable for carrier aggregation purposes;
a bandwidth part usable for dual connectivity purposes; or
a set of supported bandwidth parts in the cell.

8. An apparatus comprising:
at least one processor; and
at least one memory including computer program code, the at least one processor being configured to, with the at least one memory and the computer program code, cause the apparatus to:
instruct a base station to provide information on a limitation of one or more bandwidth parts provided by the base station, wherein the one or more bandwidth parts are one or more early data transmission bandwidth parts;
cause selection of an access parameter based on the information on the limitation of the one or more bandwidth parts supported in the cell and a limitation of one or more other bandwidth parts supported by a terminal; and cause the terminal to reselect the cell or to camp on the cell using the selected access parameter.

9. The apparatus according to claim 8, wherein the at least one processor, with the at least one memory and the computer program code, are further configured to cause the apparatus to:

provide the information on the limitation of the bandwidth part via broadcasting or dedicated signaling to the terminal.

10. The apparatus according to claim 8, wherein the at least one processor, with the at least one memory and the computer program code, are further configured to cause the apparatus to:

instruct the base station to indicate a respective priority for each of one or more other bandwidth parts supported by the terminal.

11. A method comprising:

receiving, from a base station, information on a limitation of one or more bandwidth parts supported in a cell of the base station, wherein the one or more bandwidth parts supported in the cell of the base station are one or more early data transmission bandwidth parts;

selecting an access parameter based on the information on the limitation of the one or more bandwidth parts supported in the cell and a limitation of one or more other bandwidth parts supported by a terminal;

instructing the terminal to reselect the cell or to camp on the cell using the selected access parameter; and inhibiting the terminal from accessing the cell based on the limitation of the one or more bandwidth parts supported in the cell and the limitation of one or more other bandwidth parts supported by the terminal.

12. The method according to claim 11, further comprising:

monitoring if the information on the limitation of the one or more bandwidth parts supported in the cell is received on a broadcast channel or received in dedicated signaling to the terminal.

13. The method according to claim 11, further comprising:

inhibiting the terminal from camping on the cell if the limitation of the one or more bandwidth parts supported in the cell does not match the limitation of the one or more bandwidth parts supported by the terminal.

14. The method according to claim 11, further comprising:

inhibiting the terminal from accessing the cell based on a priority for the one or more bandwidth parts supported by the terminal.

15. The method according to claim 11, further comprising:

choosing one or more types of access based on the information on the limitation of the one or more bandwidth parts supported in the cell and the limitation of the one or more bandwidth parts supported by the terminal;

instructing the terminal to access the cell according to the selected one or more types of access; and inhibiting the terminal from accessing the cell according to types of access different from the selected one or more types of access.

16. The method according to claim 11, further comprising:

inhibiting the terminal to access to the cell based on a type of the terminal.

17. The method according to claim 11, wherein the limitation of the one or more bandwidth parts supported in the cell is related to at least one of:

a bandwidth part usable by the terminal for data transmission in an INACTIVE mode;

a bandwidth part usable by the terminal for data transmission in a CONNECTED mode;

a bandwidth part usable for active data transfer;

a bandwidth part usable for sending data encapsulated in control plane messages;

a bandwidth part usable for Ultra-Reliable Low Latency Communication transmission (URLLC);

a bandwidth part reserved only for terminals of a certain Closed Subscriber Group (CSG);

a bandwidth part usable for carrier aggregation purposes;

a bandwidth part usable for dual connectivity purposes; or a set of supported bandwidth parts in the cell.

18. A method comprising:

instructing a base station to provide information on a limitation of one or more bandwidth parts supported in a cell of the base station, wherein the one or more bandwidth parts are one or more early data transmission bandwidth parts;

causing selection of an access parameter based on the information on the limitation of the one or more bandwidth parts supported in the cell and a limitation of one or more other bandwidth parts supported by a terminal; and causing the terminal to reselect the cell or to camp on the cell using the selected access parameter.

19. The method according to claim 18, further comprising:

providing the information on the limitation of the one or more bandwidth parts provided by the base station via broadcasting or dedicated signaling to the terminal.

20. The method according to claim 18, further comprising:

instructing the base station to indicate a respective priority for each of one or more other bandwidth parts supported by the terminal.

21. A non-transitory computer-readable storage medium comprising instructions stored thereon that, when executed by at least one processor, are configured to cause a computing system to perform at least:

receiving, from a base station, information on a limitation of one or more bandwidth parts supported in a cell of the base station, wherein the one or more bandwidth parts supported in the cell of the base station are one or more early data transmission bandwidth parts;

selecting an access parameter based on the information on the limitation of the one or more bandwidth parts supported in the cell and a limitation of one or more other bandwidth parts supported by a terminal;

instructing the terminal to reselect the cell or to camp on the cell using the selected access parameter; and inhibiting the terminal from accessing the cell based on the limitation of the one or more bandwidth parts supported in the cell and the limitation of one or more other bandwidth parts supported by the terminal.

22. A non-transitory computer-readable storage medium comprising instructions stored thereon that, when executed by at least one processor, are configured to cause a computing system to perform at least:

instructing a base station to provide information on a limitation of one or more bandwidth parts supported in a cell of the base station, wherein the one or more bandwidth parts are one or more early data transmission bandwidth parts;

causing selection of an access parameter based on the information on the limitation of the one or more bandwidth parts supported in the cell and a limitation of one or more other bandwidth parts supported by a terminal; and causing the terminal to reselect the cell or to camp on the cell using the selected access parameter.

* * * * *